T. L. Shaw,
Saw Set.
No. 112,970. Patented Mar. 21, 1871.
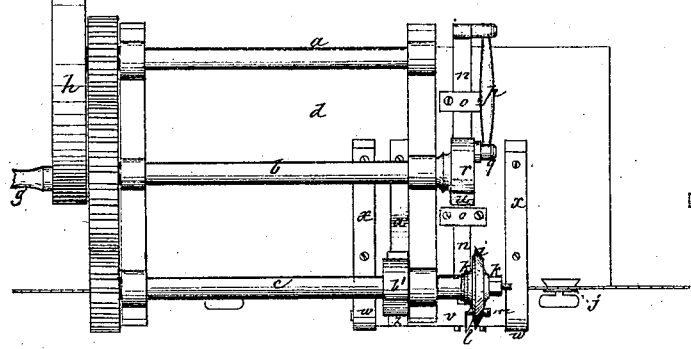
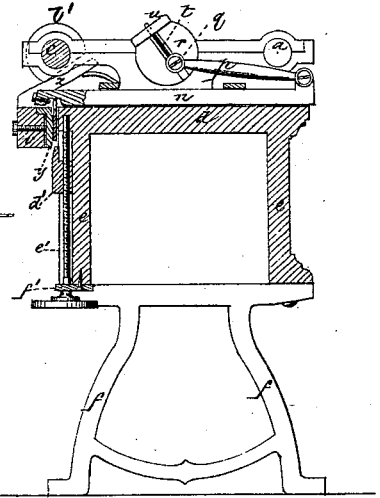
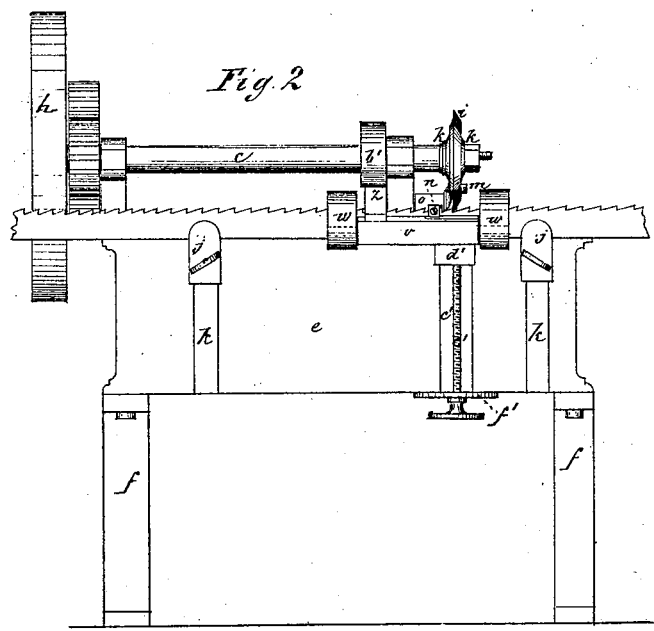
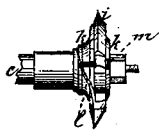
Witnesses:
Inventor:
Thomas L Shaw
per
Attorneys.

United States Patent Office.

THOMAS L. SHAW, OF OMAHA, NEBRASKA.

Letters Patent No. 112,970, dated March 21, 1871.

IMPROVEMENT IN SAW-SETS AND FILERS.

The Schedule referred to in these Letters Patent and making part of the same.

*To all whom it may concern:*

Be it known that I, THOMAS L. SHAW, of Omaha, in the county of Douglas and State of Nebraska, have invented a new and improved Saw-Filing and Setting Machine; and I do hereby declare the following to be a full, clear, and exact description of the same, reference being had to the accompanying drawing making a part of this specification, in which—

Figure 1 is a top view;

Figure 2, a side elevation;

Figure 3, a transverse vertical section; and

Figure 4, an edge elevation of the filing and setting head.

This invention relates to a machine that accurately files, sets, and feeds a saw, and is provided with means for adapting itself to saws of any and all widths, and for giving the teeth a set of any required degree of inclination.

Referring to the drawing—

$a$, $b$, and $c$ are three parallel-shafts, mounted lengthwise of the top of a plate, $d$, that rests on plates $e$, which are supported at their ends on legs $f$.

The three shafts all derive motion either directly or indirectly from the wrist $g$, of the wheel $h$.

On the end of the shaft $c$ is the annular file $i$, clamped between collars $k$.

The file $i$ has straight sides and a beveled periphery, and sharpens both sides at once of each notch in the saw successively.

The saw is supported in guides $j$, placed in vertical grooves $k$, in one of the plates $e$.

The guides may be moved up or down in the grooves, and are provided with set-screws, to fasten them wherever desired.

After each notch is filed the saw should be slid along by the space of one tooth. This is done by means of a wing, $l$, whose base is a block that sits between the collars $k$ and forms a part of the same ring with the sections of the annular file.

The wing $l$ stands off from one side of the block, its outer edge being an arc with the same radius as the file $i$. The wing should be so much inclined that the distance between its outer end and the side of the file should be equal in all cases to the interval between the points of the particular saw that is being filed, in order that the saw may be moved the proper distance each time. The regulation of the wing to accomplish this object is effected by a set-screw, $m$.

After a tooth is filed it has to be set. The setting is accomplished by means of a bar, $n$, that slides crosswise of the top of the plate $d$, in suitable guides $o$, said bar or saw-set having a transverse notch in its under side through which the saw-teeth pass one after another, and which has sides converging from the bottom upward. As this bar slides forward, one of the inclined sides of its notch strikes one of the saw-teeth and sets it; as the bar slides backward, the other inclined side of its notch strikes the next tooth and sets that.

The saw-set is made thus to reciprocate by means of a pitman, P, that connects its rear end with a wrist-pin, $q$, stationed in a slot cut in the face of a disc, $r$, fixed on the end of the shaft $b$. As the wrist-pin revolves with the disc its motion is communicated to the saw-set. The extent of the movement of the latter, and, by consequence, the amount of set given to the saw-teeth, are determined by the distance of the wrist-pin from the center of the disc $r$, and this distance is regulated by a screw, $t$, that passes through a plate, $u$, on one side of the disc, and, extending through the slot, enters the wrist-pin $q$, which is consequently moved in the slot by the turning of the screw.

While the teeth are being set and filed, both which operations take place at the same time, the saw should be firmly clamped. The clamping is effected by a block, $v$, placed at the side of the plate $d$, and suspended at its ends on journals, which enter overhanging boxes $w$, the arms $x$ of which are secured to the top of the plate $d$, said arms having grooves in their under sides, through which the saw passes, and said block being placed at a sufficient interval from the side of the plate $d$ to allow the saw to slide between the latter and the block.

A steel plate, $y$, is attached to the inner side of the block $v$, in a recess of the same.

An arm, $z$, having an upper inclined side, extends upward from the block $v$ to a suitable distance, said arm being always pressed upon from beneath by a spring, $a'$, secured to the plate $d$ under the arm.

Immediately over the arm $z$ is a segmental wheel, $b'$, on the shaft $c$, which presses the arm $z$ downward, and rotates the block $v$ inward against the saw at just the moment when the file and saw-set begin to act upon the teeth and to release the arm $z$, thus allowing the spring $a'$ to raise it and rotate the block $v$ backward, away from the saw, at just the moment when the wing $l$ begins to move the saw forward.

The plate $y$ is inclined backward, both upward and downward, from the central line of its inner face.

In a vertical groove, $c'$, in the side-plate $e$, is a block, $d'$, pierced by a screw, $e'$, that extends lengthwise of the slot, and is supported in a plate, $f'$, at the bottom of the same.

The block $d'$ has an upper facet, inclined parallel with the lower facet of the plate $y$. When the block $d'$ is screwed up so far as to strike the plate $y$ and throw the lower part of the block $v$ outward, the upper part of said block and the upper facet of the plate $y$ are moved nearer to the plate $d$, thus narrowing the space for the saw. The space for the saw is widened by the contrary operation of screwing the block $d'$ downward.

Having thus described my invention,

What I claim as new, and desire to secure by Letters Patent, is—

1. The annular file $i$, in combination with the wing $l$, as specified.

2. The reciprocating saw-set $n$, in combination with the adjustable wrist-pin $q$ and disc $r$, as described.

3. The vibrating-block $v$, in combination with the arm $z$ and eccentric $b^1$, as set forth.

4. The vibrating-block $v$, in combination with the plate $y$ and adjustable-block $d'$, as explained 5. The improved saw-filing and setting-machine, formed by the combination of rotary-file $i$, saw-set $n$, vibrating-block $v$, and the parts connected therewith, for operating upon and feeding a saw, as set forth.

To the above specification of my invention I have signed my name this 17th day of December, A. D. 1870.

THOMAS L. SHAW.

Witnesses:
 GEORGE ZANNES,
 C. SCHANDLER.